United States Patent [19]

Tomka et al.

[11] Patent Number: 5,415,827
[45] Date of Patent: May 16, 1995

[54] PROCESS FOR IMPROVING THE MECHANICAL PROPERTIES OF SINGLE-OR MULTI-PLY SHEETS

[75] Inventors: Ivan Tomka, Chalet Breitfeld, 1722, Bourguillon; Joachim Meissner, Baden; Rico Menard, Zurich, all of Switzerland

[73] Assignee: Ivan Tomka, Switzerland

[21] Appl. No.: 962,533

[22] Filed: Oct. 16, 1992

[30] Foreign Application Priority Data

Oct. 16, 1991 [DE] Germany .................. 41 34 190.2

[51] Int. Cl.⁶ .............. B29C 47/00; B29C 47/06; B29C 55/12; B29C 55/16
[52] U.S. Cl. .................. 264/510; 264/171; 264/210.1; 264/211.11; 264/288.4; 264/290.2; 428/516; 428/532; 428/910; 523/124; 523/125; 523/126; 524/52; 524/583; 524/585; 525/88
[58] Field of Search ............. 264/288.4, 290.2, 171, 264/210.1, 211.11, 510; 523/124, 125, 126; 428/516, 532, 910; 524/52, 583, 585; 525/54.3, 54.31, 88

[56] References Cited

U.S. PATENT DOCUMENTS

| 4,931,488 | 6/1990 | Chiquet | 523/126 |
| 5,045,620 | 9/1991 | Itaba et al. | 264/288.4 |
| 5,133,909 | 7/1992 | Suominen | 264/217 |
| 5,234,750 | 8/1993 | Akao | 428/516 X |

OTHER PUBLICATIONS

"Biaxial Orientation", *Encyclopedia of Polymer Science Technology*, vol. 2 pp. 339–345, 1965.

*Primary Examiner*—Leo B. Tenioni
*Attorney, Agent, or Firm*—Ostrolenk, Faber, Gerb & Soffen

[57] ABSTRACT

For the purpose of improving the quality and especially the mechanical properties of single- or multi-ply sheets with at least one ply, consisting at least in part of thermoplastically processable starch, the sheets are stretched monoaxially or biaxially after they have been produced.

16 Claims, No Drawings

PROCESS FOR IMPROVING THE MECHANICAL PROPERTIES OF SINGLE-OR MULTI-PLY SHEETS

BACKGROUND OF THE INVENTION

This invention refers to a process for improving the quality and especially the mechanical properties of single- or multi-ply sheets with a minimum of one ply consisting at least in part of thermoplastically processable starch, and to a single- or multi-ply sheet with a minimum of one ply containing at least in part thermoplastically processable starch.

Sheets produced from starch or polymer blends and with a content that includes starch are known. In addition, a series of polymer blends is known from the current state of the technology; their proposed uses include the production of sheets and they consist in part of starch.

The starting point for the increased use of starch in otherwise pure applications of plastics is, firstly, the desire to make increased use of renewable raw materials in contrast to the petrochemical or fossil basis of plastics, and secondly the requirement that plastic products produced from polymers should be biodegradable.

For example, filled polymers or polymer blends are known from EP-A-0 402 826, and they are produced by mixing natural starch or its derivatives with ethylene copolymers. In WO 90/14388 it is proposed that a polymer compound should be produced by mixing natural starch with polyethylene, adding either ethylene acrylic acid copolymers or glycerine. These polymer mixtures exhibit relatively poor mechanical properties even for the production of extruded mouldings and they are unsuitable for the production of sheets. It appears that the natural structure of starch is preserved in these blends at least in part, and this obviously detracts from their suitability as "Engineering Plastics".

In EP-A-0 327 505, EP-A-0 404 723, EP-A-0 407 350, EP-A-0 404 727 and EP-A-0 404 728, a series of polymer blends is proposed which is based on destructured starch and also contains a great variety of polymers or copolymers. Destructured starch is a modification of starch obtained from natural starch, having a moisture content of approximately 15–20%, i.e. the usual water content of natural starch, and is mechanically processed under heat. Research, particularly in connection with WO 90/05161, has shown that this destructured starch has only limited use as an "Engineering Plastic" because obviously natural starches are still present in this form of starch. This also appears to be the reason why the polymer blends proposed by the current technology—which are based on destructured starch—cannot be processed to make sheets that are free of defects. Sheets which are produced in this manner may have a brownish tint and also exhibit relatively poor mechanical values. In addition, the moisture resistance of such sheets is relatively poor.

EP-A-0 400 531 and EP-A-0 400 532 also propose that the starch should be destructured by means of a high-boiling plasticizing agent and a destructuring agent, which may take the form, for example, of glycerine used as a plasticizing agent and urea as a destructuring agent. Up to 15% ethylene acrylic acid and/or polyvinyl alcohol copolymers is added to starch which has been destructured in this manner. The plasticizing agent and the destructuring agent may enhance the destructuring effect in natural starch, but sheets produced in accordance with EP-A-O 400 531/32, both cited above, are not of the quality required for them to be used, for example, as packaging films with higher mechanical requirements.

For this reason an attempt has been made to start from the thermoplastically processable starch proposed in WO 90/05161 (corresponding to U.S. Ser. No. 07/785,931), which is almost entirely free of natural structural elements. The present document does not contain a detailed description of the production and characteristics of thermoplastically processable starch, but reference is made to WO 90/05161, the content of which is hereby incorporated in this description. Briefly, an essentially water-free starch is combined with an additive which lowers the melting point of the starch so that the melting point of the starch/additive mixture lies below the decomposition temperature of the starch, the additive having a solubility parameter of over 15 cal$^{\frac{1}{2}}$cm$^{-3/2}$ and a vapor pressure lower than 1 bar at the melting range of the starch/additive mixture, and the resulting mixture is caused to melt by the application of heat and mechanical energy to realize an essentially moisture-free product.

Consequently, the as yet unpublished PCT/CH91/00078 (corresponding to U.S. Ser. No. 07/778,164) uses the abovementioned thermoplastically processable starch as the starch basis for the production of a polymer blend. In accordance with PCT/CH91/00078, the thermoplastically processable starch (TPS) is, for the purpose of producing the blend, mixed with a polyolefin, for example polyethylene or polypropylene. During the mixing it is preferable to add a phasing or bonding agent in the form of a block copolymer to facilitate the mechanical bonding between the starch and polyolefin phases. The sheets produced from this blend exhibit good mechanical properties and are highly moisture-resistant, although additional improvements still appear to be desirable and possible.

DESCRIPTION OF THE INVENTION

One of the purposes of this invention is therefore, taking PCT/CH91/00078 as its basis, to improve the properties and the quality of sheets that consist at least in part of starch.

As was stated above, the starting point is the as yet unpublished PCT/CH91/00078, which proposes that in the production of single- or multi-ply sheets at least one of the plies should include at least in part thermoplastically processable starch. This ply can either consist basically almost entirely of thermoplastically processable starch or else consist of a polymer blend containing thermoplastically processable starch and at least a polyolefin such as polyethylene or polypropylene, and preferably a phasing or bonding agent in the form of a block copolymer. In accordance with this invention now proposed that, after these single- or multi-ply sheets have been produced, they should be stretched monoaxially or biaxially.

The known technique of stretching pure plastic sheets has so far not been applied to sheets known to the current technology that are made from starch because starch or polymer mixtures containing starch obviously did not appear suitable for this technique. It appears that when the stretching procedure is applied to polymer blends used in accordance with the current technology, a phase separation occurs between the starch and the remaining polymer phase which renders these sheets almost unusable. It is possible that the relatively high moisture content of the polymer blend proposed by the current technology is the reason why stretching the sheets which are produced does not give satisfactory results.

It would however be possible, in the case of sheets with a thermoplastically processable starch base, produced in accordance with PCT/CH91/00078, to obtain a significant improvement by means of the stretching procedure with respect, for example, to mechanical strength. In this connection it is possible to stretch the sheets either monoaxially or biaxially.

For the stretching of sheets produced in accordance with PCT/CH91/00078, it is appears to be essential for a comonomer of the copolymer or of the phasing agent between the starch and the polyolefin, during production of the polymer blend to have formed a covalent chemical bond with the starch. This covalent chemical bond can, for example, be demonstrated by means of the infrared spectrum, and this procedure has shown that, when a covalent chemical bond of this kind is absent, it is practically impossible to stretch sheets produced from the polymer blend referred to above. This must also be the reason why, as was mentioned above, the polymer blends proposed by the current technology and the sheets produced from them are not suitable for stretching.

It is further proposed to select a stretching ratio in the range from 1:4 to 1:10.

As each sheet is assembled and built up it may be advantageous to select a ratio of 1:6 to 1:8.5, the preferred ratio being in the range of approximately 1:7 to 1:7.5.

It is actually possible to stretch the sheets produced at room temperature. It has, however, been found advantageous to perform the stretching operation within a temperature range of approximately 90°–130° C.

It is further proposed that the polymer or the polymers before they are fused or melted should, while the sheet is being produced, be dried to the point where they are at least almost moisture-free.

In this connection it is advantageous if the moisture content of at least the polymer or polymers or polymer melts containing the thermoplastically processable starch is dried or vented during production of the sheets so as to reduce it to <1%.

In a manner analogous to the process proposed by the invention, it is proposed to produce single- or multi-ply sheets with at least one ply containing at least in part thermoplastically processable starch.

The invention will now be explained below in detail by means of examples.

EXAMPLE 1

Production of the thermoplastically processable starch:

67 kg of natural starch with a moisture content of <0.3% are decomposed with 33 kg of glycerine (99% strength) in a twin-shafted kneader with meshing screws with kneading blocks or a so-called co-kneader (for example, the Buss Company's product) with kneading blocks and stowage rings at a temperature of 160°–190° C. Mechanical energy is supplied to the mixture in an order of magnitude of 0.3–0.5 kWh/kg of melt. The melt is then extruded and, for example, granulated.

The thermoplastically processable starch produced in this manner is a homogenous, amorphous mass which crystallizes only slightly when stored. The formation of thermoplastically processable starch is characterized by the following structural changes:

loss of the natural conformation of the starch in the glycoside O-bonds, with a decrease in the dihedral angles (broadening of the helical structure) on the glycoside oxygen atom of $> -20°$ C. to $< -20°$ C.;

loss of the double refraction of the starch;

loss of the reflexes detectable in the starch in the wide-angle X-ray diffraction exceeding a scattering angle of 2°;

As was mentioned above, for further details reference should be made to WO 90/05161. In this connection it should be emphasized that other agents besides glycerine can of course be used to convert the natural starch, for example, ethanolamine or propanolamine, sorbitol or urea.

The thermoplastically processable starch produced as in the example is used in one of the following examples to produce a multi-ply sheet.

EXAMPLE 2

Production of a polymer blend.

75 kg of natural starch with a moisture content of <0.3 percent of its weight calculated from a dry sample of the starch, 25 kg of glycerine (99% strength), 50 kg of high-density polyethylene (HDPE) with a melt flow index at 190° C. and 5.1 kg of 0.1 in 10 minutes, and 50 kg of an ethylene/acrylic acid ethyl ester/maleic acid anhydride copolymer are mixed together in a twin-shafted blender or a co-kneader at 190° C. in a manner analogous to that in Example 1 and then extruded and granulated. The copolymer used in this process has the following composition: Ethylene 90 moles percent Acrylic acid ethyl ester 8 moles percent, and Maleic acid anhydride 2 moles percent.

The use of the block copolymer as a phasing agent is only an example, since actually all products normally used to compound two-phase polymer blends can be used as phasing agents. Examples are "LOTADER", produced by CDF-Chemie, "NOVATEC" produced by Mitsubishi Chemicals, "SURLYN" produced by Dupont or "LONPLY" produced by Moats Tots. The essential requirement is that the two phases—thermoplastically processable starch and polyethylene—are thoroughly mixed together and subsequent separation is prevented.

It is important for the production of the polymer blend that one of the comonomers of the copolymer or the phasing agent forms a covalent chemical bond with the starch. If, for example, the moisture content is too high when the polymer blend is being produced the copolymer will be deactivated through the absorption of water and the covalent chemical bond with the starch, referred to above, will be prevented. The absence of this covalent chemical bond has consequences for the subsequent production of sheets and for the stretching of these sheets.

It is of course possible to select a polyolefin other than the selected high-density polyethylene, for example, polypropylene.

In the following examples, the polymer mixture produced in Example 2 is used to produce stretched sheets of the kind to which the invention refers.

EXAMPLE 3

Single-ply sheet produced from a polymer blend as in Example 2:

The polymer blend produced in Example 2 is dried to reduce its moisture content to <1 percent of its weight. Sheets are then blown from the polymer mixture, the thickness of the plies being of the order of 50–120μ. Processing takes place under the following conditions:
Worm screw diameter D 25 mm
Overall length of worm screw 25 D
Charging zone 9 D Temperature 160° C.
Compression zone 8 D Temperature 165° C.
Homogenization zone 4 D Temperature 170° C.
Madoc mixing element 4 D
Depth of screw in the charging zone 3.5 mm
Depth of screw in the homogenization zone 1.75 mm
Speed of screw 80 min$^{-1}$ The measured mass temperature is 150° C. and the pressure in the stowage area in front of the extrusion jet is 470 bars. The sheets produced in this manner from the starch polymer blend are then stretched, either at room temperature or at a higher temperature up to 130° C. with a stretch ratio of 1:6 to 1:7.5 in one direction, i.e. monoaxially. The resulting sheets have the following mechanical properties:
Tension at breaking point: 40–200 MPa
Elongation at breaking point: 10–270%
Energy expenditure up to breaking point: 4 MJ/mm$^2$ The various stretch conditions and the corresponding measured mechanical properties are summarized in the following table. They are to be interpreted in accordance with the following definitions:
$\sigma_B$=Tension at breaking point, defined as measured strength at breaking point, calculated from the initial cross-section (technical tension)
$D_\varepsilon\%$ =Relative elongation as % of the initial length of the sample=$(L/L_0-1)\times 100\%$, where L=Length in the stretched state and $L_0$=initial length
E=Modulus of elasticity, calculated from the initial slope of the tension-elongation curve for a simple traction test
$W_B$=Expenditure of energy up to breaking point
$\lambda_R$=Stretch ratio $L/L_0$
$\xi$=Speed of elongation during stretching=en $L/L_0/S$
$V_K$=Clamping speed during stretching
$T_R$=Temperature at which the stretching operation is performed. The stretching tests were performed in two ways:
simple monoaxial lengthening and
equi-biaxial lengthening sheets are substantially better than they are in the comparatively unstretched sheet.

It is also interesting to make a comparison with pure polyethylene sheets, from which it appears that the addition of starch to the polymer blend actually has a negative effect on the mechanical values. The mechanical properties of sheets produced from the polymer blend as in Example 2 are still good after stretching in a ratio of approximately 1:7.

In addition, the importance of the presence of a covalent chemical bond between a comonomer of the copolymer and the starch has been investigated and demonstrated by means of a single-ply sheet produced as in Example 3 from a polymer blend as in Example 2. A single-ply sheet was actually produced under conditions analogous to those described above, starting, however, from a polymer blend during the production of which the moisture content exceeded 3%. It was possible to demonstrate in the infrared spectrum that practically no covalent chemical bonds are present between the copolymer and the thermoplastically processable starch, apparently because the copolymer has been deactivated by absorption of water. The single-ply sheet produced in this analogous manner was also stretched and already revealed holes with a stretching of λ=1.5, i.e. it had already become unusable. For comparative purposes reference may be made to the stretch conditions in Table 1, where the stretching in most cases ranges up to λ=7.4.

This is, actually, the explanation for the fact that the polymer blends proposed by the current technology and the sheets produced from them cannot be stretched.

EXAMPLE 4

Multi-ply sheet

The sheet described has three plies of types ABA, the two outer cover plies being produced from the polymer blend described in Example 2 and each having a thickness of 10μ, and the middle ply B being produced from thermoplastically processable starch as in Example 1 and having a thickness of 120μ.

The production of such a three-ply sheet is effected by means of known co-extrusion technology, through which the three-ply sheet can either be blown or produced as a flat laminate. The conditions of extrusion are essentially analogous to those indicated in Example 3, i.e. temperatures in the extruders are selected within a range of approximately 160°–170° C.

Since thermoplastically processable starch is present

TABLE 1

| | $T_R$(°C.) | $\lambda_R$ | $V_K$(mm/min) | $\xi$(sec$^{-1}$) | $\sigma_B$ (MPa) | $D_B$(%) | E(MPa) | $W_B$ (MJ/m$^2$) |
|---|---|---|---|---|---|---|---|---|
| Unstretched sheet | | 1 | | | 25 | 600 | 180 | 10,6 |
| Stretched | 20 | 6,2 | 80 | | 161 | 42 | 340 | 3,8 |
| Stretched | 140 | 7,4 | | 0,1 | 19 | 33 | 300 | |
| | 128 | 7,4 | | 0,2 | 200 | 10 | 3,300 | |
| | 128 | 7,4 | | 0,1 | 110 | 25 | 1,500 | |
| | 128 | 7,4 | | 0,01 | 85 | 6 | 2,400 | |
| | 121 | 7,4 | | 0,2 | 160 | 8 | 3,000 | |
| | 121 | 7,4 | | 0,1 | 160 | 11 | 2,500 | |
| | 103 | 4,5 | | 0,1 | 143 | 17 | 1,900 | |
| | 92 | 3,3 | | 0,1 | 38 | 270 | 330 | |
| Pure Polyethylene stretched | 128 | 7,4 | | 0,2 | 610 | 12 | 8,160 | 2 |

Table 1 clearly shows that the values for the breaking tension and the modulus of elasticity in the stretched both in ply A and in ply B there is excellent adhesion between the plies and it is not necessary to add a bonding agent or insert an intermediate ply.

The three-ply sheet described has also been stretched in a ratio of 1:7 at a temperature of 128° C. and a speed of elongation of 0.2. The following mechanical properties were measured on the stretched sheet:

$\sigma_B$: 35 MPa
$D_B$: 10%
E: 700 MPa and
$W_B$: 3 MJ/mm$^2$.

Although the three-ply sheet described consists almost entirely of thermoplastically processable starch—the overall proportion of polyethylene and copolymer is less than 10%—the mechanical properties are, with respect to tension at breaking point and modulus of elasticity, substantially better in comparison to those of the unstretched sheet referred to in Example 3 and produced exclusively from the polymer blend.

The sheets described in Example 3 and Example 4 are of course only two examples of embodiments used to explain the invention. These examples can of course be altered or modified or expanded in any manner. Polypropylene or another polyolefin or a polymer resembling polyolefin may be used instead of polyethylene, a different phasing agent may be used instead of the selected block copolymer, or the proportion of thermoplastically processable starch may be increased or diminished. The essential feature of the invention is that a single- or multi-ply sheet includes at least one ply consisting essentially or at least in part of thermoplastically processable starch which after it has been produced is stretched monoaxially or biaxially.

PCT/CH91/00078, which had not been published as of 16 Oct. 1991, been published under reference number WO91/16 375.

We claim:

1. A process for improving the quality and particularly the mechanical properties of single- or multi-ply sheets with at least one ply consisting at least in part of essentially moisture-free thermoplastically processable starch, which is the melted mixture product of essentially moisture-free starch and an additive having a solubility parameter of over 15 cal$^{\frac{1}{2}}$cm$^{-3/2}$, a vapor pressure of lower than 1 bar in the melting range of the starch/additive mixture, and which lowers the melting point of the starch so that the melting point of the starch/additive mixture lies below the decomposition temperature of the starch, characterized by the fact that the materials used to form the plies are dried before or during production of the sheets at least to the point where they are essentially moisture-free, the sheets are produced and the produced sheets are thereafter stretched monoaxially or biaxially.

2. A process, described in claim 1, characterized by the fact that the sheets are stretched in a ratio of 1:4 to 1:10.

3. A process, as described in claim 1, characterized by the fact that the sheets are stretched in a ratio of 1:6 to 1:8.5.

4. A process, as described in claim 1, characterized by the fact that the stretching of the sheets is effected within a temperature range from room temperature to approximately 130° C.

5. A process as described in claim 3, characterized by the fact that the sheets are stretched in a ratio of approximately 1:7.

6. A process as described in claim 4, characterized by the fact that the stretching of the sheets is affected within a temperature range of 90°–130° C.

7. A process as described in claim 1, characterized by the fact that the moisture content of the materials for the sheets is reduced to less than 1% before or during production of the sheets.

8. A process as described in claim 7, characterized by the fact that the sheets are stretched in a ratio of 1:6 to 1:8.5 at a temperature of 90°–130° C.

9. Single- or multi-ply sheets which are monoaxially or biaxially stretched and contain a polyolefin covalently bonded to essentially moisture-free thermoplastically processable starch, which is the melted mixture product of essentially moisture-free starch and an additive having a solubility parameter of over 15 cal$^{\frac{1}{2}}$cm$^{-3/2}$, a vapor pressure of lower than 1 bar in the melting range of the starch/additive mixture, and which lowers the melting point of the starch so that the melting point of the starch/additive mixture lies below the decomposition temperature of the starch.

10. Single- or multi-ply sheets, as in claim 9, characterized by the fact that they consist of at least one ply made from a polymer blend containing thermoplastically processable starch, at least one polyolefin and a block copolymer as phasing agent.

11. Single- or multi-ply sheets, as in claim 9, characterized by the fact that the sheets contain three plies, with the middle ply consisting essentially of thermoplastically processable starch and each of the two cover plies consisting either of a polymer blend containing thermoplastically processable starch, a polyolefin and a phasing agent or consisting essentially of at least one polyolefin.

12. Single- or multi-ply sheets, as in claim 10, characterized by the fact that the polymer blend consists of 30–70% of its weight of thermoplastically processable starch, up to 30% of its weight of a block copolymer as phasing agent and the rest of polyolefin.

13. Single- or multi-ply sheets as in claim 11, characterized by the fact that the polymer blend consists of 30–70% of its weight of thermoplastically processable starch, up to 30% of its weight of a block copolymer as phasing agent and the rest of polyolefin.

14. Single- or multi-ply sheets, as in claim 1, characterized by the fact that the polyolefin is polyethylene or polypropylene.

15. Single- or multi-ply sheets, as in claim 11, characterized by the fact that the polyolefin is polyethylene or polypropylene.

16. Single- or multi-ply sheets, as claimed in claim 9, characterized by the fact that the polyolefin is polyethylene or polypropylene.

* * * * *